United States Patent
Sun et al.

(10) Patent No.: US 9,960,604 B2
(45) Date of Patent: May 1, 2018

(54) SYSTEM AND METHOD FOR OPERATING AN ELECTRIC POWER SYSTEM WITH DISTRIBUTED GENERATION AND DEMAND RESPONSIVE RESOURCES BASED ON DISTRIBUTION LOCATIONAL MARGINAL PRICES

(71) Applicant: Mitsubishi Electric Research Laboratories, Inc., Cambridge, MA (US)

(72) Inventors: Hongbo Sun, Plymouth, MN (US); Bowen Zhang, Boston, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 748 days.

(21) Appl. No.: 14/513,293

(22) Filed: Oct. 14, 2014

(65) Prior Publication Data
US 2016/0105029 A1   Apr. 14, 2016

(51) Int. Cl.
H02J 4/00 (2006.01)
H02J 3/14 (2006.01)

(52) U.S. Cl.
CPC .............. *H02J 4/00* (2013.01); *H02J 3/14* (2013.01); *H02J 2003/146* (2013.01); *Y02B 70/3225* (2013.01); *Y04S 20/222* (2013.01); *Y04S 20/224* (2013.01)

(58) Field of Classification Search
None
See application file for complete search history.

(56) References Cited

U.S. PATENT DOCUMENTS 7,085,660 B2 *  8/2006  Mansingh .............. G06Q 50/06
                                                  700/291
7,236,896 B2 *  6/2007  Farkas ...................... H02J 3/14
                                                  702/60
7,324,977 B2 *  1/2008  Peljto ...................... G05B 19/00
                                                  705/37

(Continued)

OTHER PUBLICATIONS

Vale et al. "LMP Based Bid Formation for Virtual Power Players Operating in Smart Grids", 2011 IEEE, pp. 1-8.*

(Continued)

*Primary Examiner* — Van Nguyen
(74) *Attorney, Agent, or Firm* — Gene Vinokur; James McAleenan; Hironori Tsukamoto

(57) ABSTRACT

An iterative framework to optimally integrate various distributed generations (DG) and demand responsive resources (DRR) within a distribution system into transmission market clearing. The concept of distribution aggregated demand and distribution aggregated utility represent a summed distribution level information in consuming electricity that encompasses preferences of the individual DGs and DRRs. This distribution level preference, which is derived based on unbalanced three-phase AC optimal power flow, is bid into the transmission level for optimal market clearing. When the aggregated preferences cannot be obtained, an iterative method enables the transmission and distribution networks to exchange price and demand information. A competitive equilibrium is reached when the method converges to a price-demand coupling point.

20 Claims, 7 Drawing Sheets

(56) References Cited

U.S. PATENT DOCUMENTS

| | | | |
|---|---|---|---|
| 7,337,153 B2* | 2/2008 | Peljto | G06Q 40/04 705/37 |
| 7,343,361 B2* | 3/2008 | Peljto | G06Q 10/06 705/37 |
| 8,265,798 B2 | 9/2012 | Imes | |
| 8,554,382 B2 | 10/2013 | Hindi et al. | |
| 8,571,955 B2 | 10/2013 | Al Faruque et al. | |
| 8,626,353 B2* | 1/2014 | Ghosh | G06Q 10/04 700/28 |
| 8,639,392 B2 | 1/2014 | Chassin | |
| 2012/0185106 A1* | 7/2012 | Ghosh | G06Q 10/04 700/291 |

OTHER PUBLICATIONS

Vaskovskaya "LMP dependence function of variable parameters of electric power network", 2014 IEEE, 5 pages.*

Silva et al. "The Interaction Between DSO and TSO to Increase DG Penetration—The Portuguese Example", 2012 IEEE, 4 pages.*

Behrangrad et al. "Analyzing the System Effects of Optimal Demand Response Utilization for Reserve Procurement and Peak clipping", 2010 IEEE, pp. 1-7.*

* cited by examiner

SYSTEM AND METHOD FOR OPERATING AN ELECTRIC POWER SYSTEM WITH DISTRIBUTED GENERATION AND DEMAND RESPONSIVE RESOURCES BASED ON DISTRIBUTION LOCATIONAL MARGINAL PRICES

FIELD OF THE INVENTION

The invention relates generally to operating an electric power system, and more particularly to generating, transmitting, and distributing electric power based on prices for distributed supply and demand of the power.

BACKGROUND OF THE INVENTION

A typical conventional electric power system includes a transmission system operated by a transmission system operator (TSO) and one or more distribution systems operated by electricity utility companies or distributed system operators (DSOs). The transmission system transmits electric power from generators to the distribution systems via substations. The distribution systems supply the power to loads at consumers, e.g., factories, businesses and homes.

In modern electric power systems, distributed generations (DGs) and demand responsive resources (DRRs) are increasingly common. DG can includes generators powered by solar, wind, landfill gas, and diesel fueled generators. Small generators, such as natural gas fueled micro-turbines can be co-located with consumers.

DRRs change power consumption patterns as a function of price, which can include time-based, critical peak, variable peak, and real time pricing. DRRs can also include comfort level factors, such as reducing power to heating, ventilation, and air conditioning (HVAC) units during peak demand periods. Another comfort level can be ensuring electric vehicle batteries are fully charged when needed. As a characteristic of DG and DRR, the supply and demand for power can vary unpredictably over time.

Typically, the price for the power depends on numerous factors, including the cost to generate and distribute the power, and the needs of the DRR. Typically, a market clearing price and demand for energy (MCPDE) for large geographic regions is set by an open wholesale energy market based on buy and sell bids. In conventional power systems, wherein the supply is primarily pre-scheduled, and the demand is mostly predictable, the MCPDE can be determined days, if not weeks, prior to actual consumption.

However, the flexibility and variations of the DG and the DRR have a major impact on setting the MCPDE, because changes in sunlight and wind, as well as consumer needs tend to be unpredictable. Therefore, in a real-time market for the MCPDE, a response time in the order of seconds may be required.

To optimally use and integrate the supply and demand into the MCPDE in a modern electric power system, two issues need to be solved. The first issue is applying an appropriate pricing mechanism at the distribution level so that the DG and DRR can be awarded according to their specific spatial and temporal contributions. Currently, the TSO-operated wholesale market does not distinguish prices for the loads connected the same substation where all demands are charged at the same averaged price to recover the generation and operation costs. However, this pricing mechanism is unfair for consumers at different locations in power distribution systems. For example, power distributed to remote consumers suffers a greater loss than the power for consumers close to the substations.

The second issue is to optimally integrate the distribution level demand preferences into the transmission network such that the market clearing at the transmission level can account for the impacts of the distribution level. The challenge for the second issue is how to accurately acquire aggregated demand preferences at the distribution level with the participation of the DG and the DRR. However, the demand curves considering the participation of DRR and DG can vary over time due to time varying bidding strategies of the DRR and DG, and therefore the DSO might not obtain the demand curve for all possible scenarios.

Several methods are known for dealing with demand responsive and distributed energy resources in the wholesale energy market. For example, U.S. Pat. No. 8,639,392 describes price quantity bidding from consumers in electricity markets. U.S. Pat. No. 8,554,382 uses a multivariable control approach to provide regulation reserve and demand response to real time correct for the power imbalance. U.S. Pat. No. 8,265,798 achieves congestion reduction by curtailing energy production. U.S. Pat. No. 8,571,955 describes an aggregator based micro-gird incorporating renewable energy resources.

However, all of those methods do not provide an optimal integration of adjustable supply and demands at the TSO and DSO levels.

SUMMARY OF THE INVENTION

An electric power system includes a transmission system operated by a transmission system operator (TSO) and one or more distribution systems operated by electricity utility companies or distributed system operators (DSOs). The embodiments of the invention provide a three-phase operation optimization based approach to represent an aggregated demand curve for the distribution system to replace a commonly used assumed utility function based approach.

The DSO obtains the aggregated demand curve by solving an unbalanced three-phase alternating current (AC) optimal power flow (OPF) problem based on locational marginal prices (LMP) obtained from substations. An aggregated utility function is determined as an integration of the aggregated demand curve that provides the distribution incremental demand when price increases.

An objective function used by the DSO minimizes a cost that is a sum of:
power from the transmission system;
power from distributed generators (DG); and
comfort losses by demand responsive resources (DRR) when scheduled consumptions deviate from expected regular levels.

The DGs are paid and the DRRs are charged according to distribution locational marginal prices (DLMPs) defined per phase and per bus.

The invention can use an iterative method to handle scenarios when the DSO cannot obtain an aggregated demand curve at the distribution level. In this embodiment, the demand from the DSO and the price from the TSO are iteratively updated to reach a competitive equilibrium between aggregated demand and LMP at a market clearing price and demand for energy (MCPDE) that efficiently couples the transmission and distribution system.

When receiving LMP from the TSO, the DSO solves the unbalanced three-phase AC OPF problem, and updates the demand information for the TSO. The DSO can also solve a balanced single-phase AC OPF problem if the distribution system is a three-phase balanced system. In response, the TSO solves a balanced single-phase DC OPF problem to minimize the cost of generation and distributing power. Then, the TSO sends the LMP to the DSO. A diminishing step size is used while updating the demand and the price information during the iterations over time until the demand and price values converge to the competitive equilibrium. This can avoid oscillation or divergence of the LMP and the demand coupling due to an improper step size during the iterations.

The iterative method can be applied to single and multi-period market clearing integration problems. For the single-period optimal integration problem, the locational effects of the DRR and DG are considered. For the multi-period optimal integration problem, additional temporal constraints for the DG and the DRR, based a maximal and minimal ramping rate of each generation resource and energy neutrality for each DRR, are considered.

DETAILED DESCRIPTION OF THE PREFERRED EMBODIMENTS

Figure 1A:
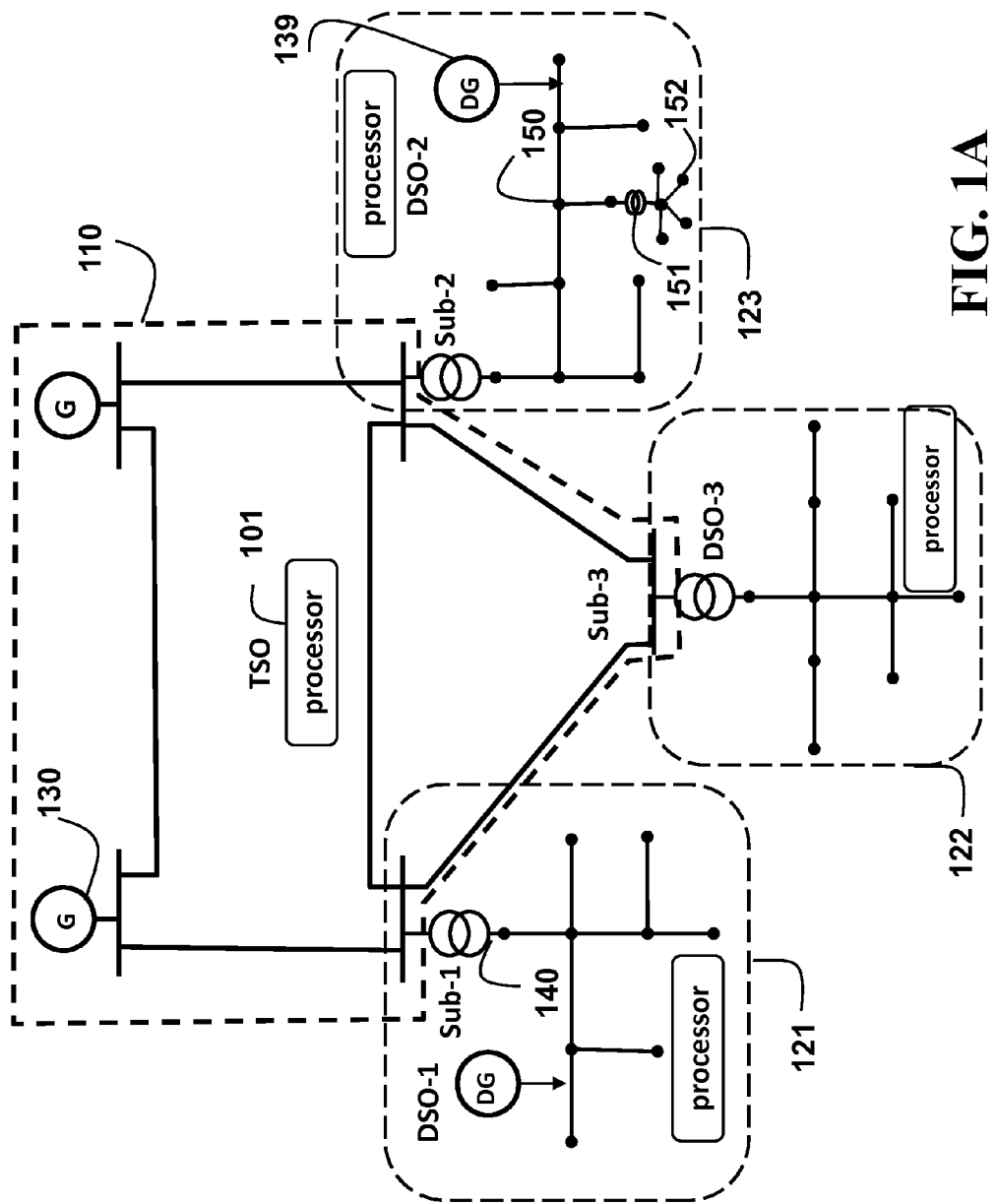
FIG. 1A is a schematic of an electric power system operating according to embodiments of the invention.

As shown schematically in FIG. 1A, an electric power system, which uses embodiments of the invention, can be partitioned into a transmission system 110 operated by a transmission system operator (TSO) and one or more distribution systems 121-123 operated by electricity utility companies or distribution system operators (DSOs). For simplicity of this description, the terms TSO and transmission system, and DSO and distribution system are used interchangeably.

The transmission system 110 transmits electric power from generators (G) 130 to the distribution systems via substations (Sub-n) 140. The distribution systems supply the power to loads 150 at consumers, e.g., factories, business and homes. The loads are connected to the substations by buses. The lines in the transmission system generally operate at a transmission-voltage level (for example, 138 kV), stepped down to a primary distribution voltage level (e.g., 34 kV) by the substations, and finally to a secondary distribution voltage level (e.g., 480/240/120 V) by transformers 151 close to the consumers 152.

The TSO and DSO have access to one or more processors 101. The processors include memory and I/O interfaces connected by computer buses. Some of the processors located at substations can measure electrical values in the system, e.g., voltages and phase angles. To facilitate the interchange of data between the TSO and DSO, the processors can be connected to a network. In a smart grid, smart meters also provide local processing and bidirectional communication between the DSO consumers. Thus, the steps of the methods according to the embodiments that are performed by the TSO and DSO can be implemented in the processors.

Of a particular concern to some embodiments, are variable distributed generation (DG), e.g., solar and wind generators, and variable distributed response resource (DRR). DRR are loads, e.g., machine and appliances, that change the consumption of power in response to changes in the price of electricity over time, or to incentive payments designed to induce lower electricity use at times of high wholesale market prices or when system reliability is jeopardize.

As another distinction, when compared with conventional electric power systems, the DG 139 can be located in the distribution system, perhaps even co-located with the consumers. The power generated by the DG can be used locally, sold back to the DSO, the TSO, or converted to credit. As a characteristic of the DG, the supply and demand of power and locations of the DG can be unpredictably over time. Herein, the terms distributed generators and variable generators are used interchangeably.

As the penetration of distributed generations and demand responsive resources increases in electric power systems of the future, they have a greater impact on the energy market clearing. Conventional systems have no pricing strategy for such configurations.

Figure 1B:
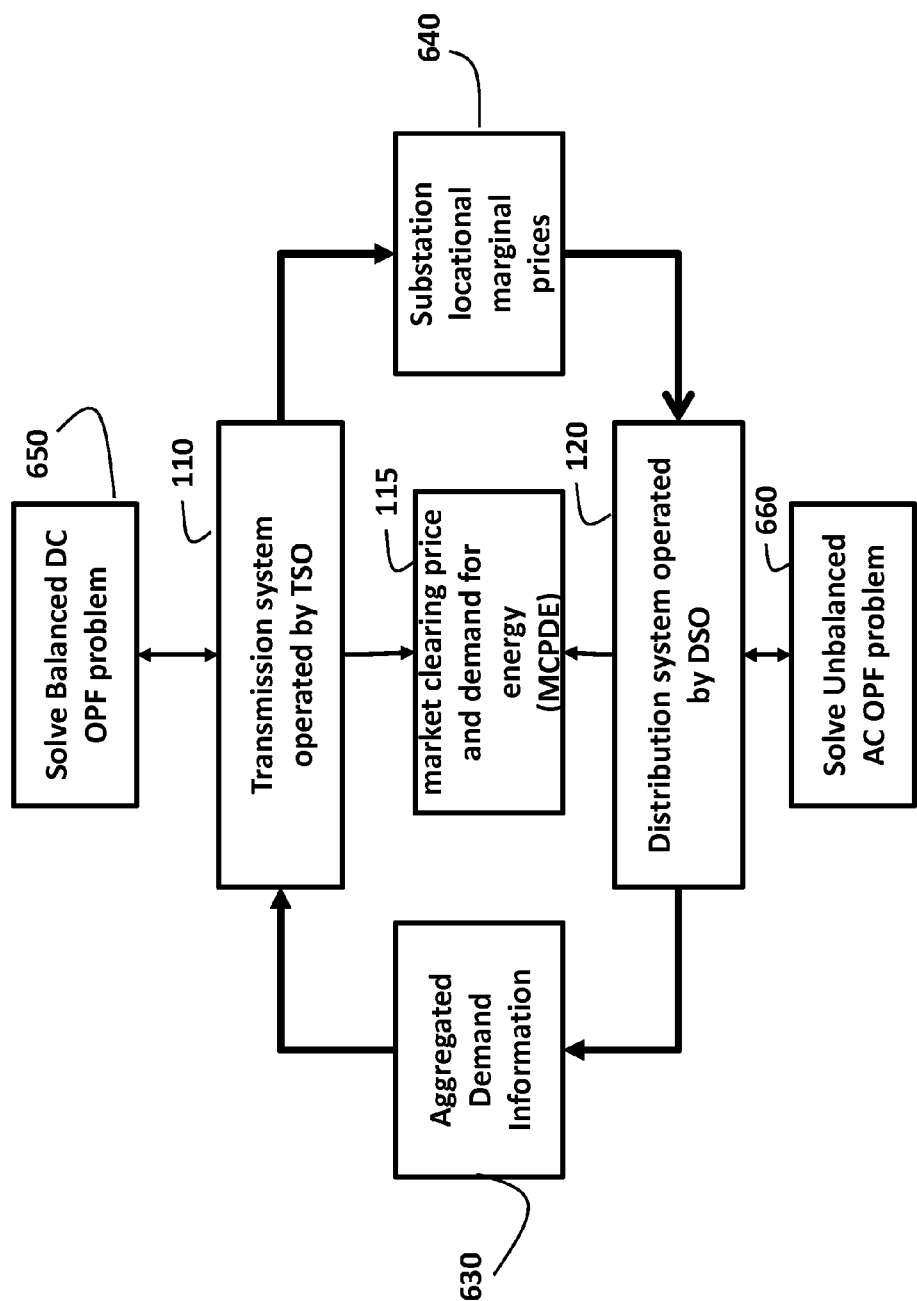
FIG. 1B is a flow diagram of a method for operating the system of FIG. 1A according to embodiments of the invention.

FIG. 1B shows a general method for operating the electric power system as shown in FIG. 1A with fixed and variable generators, and fixed and variable loads. The method iterates between updating aggregated demand information, and locational marginal prices (LMP). At each time step t, the DSO operating the distribution system 120 receives the substation LMP 640 from the TSO operating the transmission system 110. The DSO solves 660 an unbalanced three-phase alternating current (AC) optimal power flow (OPF) problem to update aggregated demand information 630 based on the substation LMP. This demand information can be the amount of aggregated demand, and can also include a distribution aggregation utility function, when available. Then, the TSO solves 650 a balanced single-phase direct current (DC) OPF problem to determine the LMP according to the new demands. The steps iterated until a competitive equilibrium between aggregated demand and substation LMP is reached at a market clearing price and demand for energy (MCPDE) 115 that efficiently couples the transmission and distribution system. Details of the method and system are described with reference to FIG. 6.

Modeling of Single-Period Optimal Operation of Power Systems with Distribution Flexibility Unbalanced Three-Phase AC OPF Model for DSO An optimal operation of a distribution system is achieved by paying and charging for the generations and loads at the distribution level based on the distribution locational marginal prices (DLMPs) during operational periods. A typical operational period can be 5, 15 minutes, 30 minutes or 60 minutes, while multiple periods can extend over, e.g., 1, 3, 6, 12, 24 hours or longer. Accounting for the three-phase unbalanced characteristics of distribution systems, the DLMPs are determined for every phase of each bus to differentiate the contributions of locations and phases.

A single-period operation of a distribution electric power system and method, as shown in FIGS. 1A and 1B with distributed generations and demand responsive resources, can be formulated as an optimization of the unbalanced three-phase AC OPF problem.

Two types of admittance matrices are used for modeling the distribution system with unbalanced power flow, including one system admittance matrix, and a set of branch admittance matrices for each branch within the power distribution system.

The system admittance matrix $Y^{AC\text{-}SYS}$ defines a relationship between injected currents and voltages at each phase of all buses in the system. The system admittance matrix is a square matrix, and a size of its rows is equal to the total number of available phases for all buses in the system. The matrix can be decoupled into a real system conductance matrix $G^{AC\text{-}SYS}$ and an imaginary system susceptance matrix $B^{AC\text{-}SYS}$ to be used in the formulation of the power flow equations.

The system admittance matrix is based on a topology of branches in the distribution system, and an associated branch admittance matrix for each branch. For a branch between bus i and bus j, a branch admittance matrix $Y^{AC\text{-}ij}$ can be used to define the relationship between the injected currents and voltages at each phase of terminals buses on the branch. The branch admittance matrix is also a square matrix, and the size of its rows equals to twice the total number of available phases of the branch. The branch admittance matrix includes a real conductance matrix $G^{AC\text{-}ij}$ and an imaginary branch susceptance matrix $B^{AC\text{-}ij}$. The formulation of branch admittance matrix can be different for different types of branches. For example, for a line segment, the admittance matrix is defined by its series impedances and the shunt admittances. For a transformer, the admittance matrix is defined by the winding connections, tap positions, and impedances.

The objective of the unbalanced AC-OPF problem is to minimize a cost that is a sum of:

cost of power from the transmission system with a unit price given for each substation;

cost of power from local distributed generators; and cost of customers' participation as demand responsive resources (DRR), such as comfort losses when scheduled consumption deviates from expected regular levels.

This objective can be expressed as:

$$\min_{P_{S_{i,m}}, P_{G_{i,m}}, P_{R_{i,m}}} f(P_{S_{i,m}}, P_{G_{i,m}}, P_{R_{i,m}}), \qquad (1)$$

wherein $f(.)$ is the objective function, $P_{S_{i,m}}$ is the power imported from TSO at the substation bus i on phase m, $P_{G_{i,m}}$ is the power generated by the DG bus i on phase m, and $P_{R_{i,m}}$ is the power consumed by the DRR bus i on phase m.

The objective function $f(P_{S_{i,m}}, P_{G_{i,m}}, P_{R_{i,m}})$ is defined according to:

$$f(P_{S_{i,m}}, P_{G_{i,m}}, P_{R_{i,m}}) = \Sigma_{i \in DSUB} LMP_i * P_{S_i} + \Sigma_{i \in DGBUS} \Sigma_{m \in PH_i} C_{i,m}(P_{G_{i,m}}) + \Sigma_{i \in DRBUS} \Sigma_{m \in PH_i} U_{i,m}(P_{R_{i,m}}). \qquad (2)$$

The first term of Eq. (2) is the power provision cost for transmission system. The TSO charges the power consumption of DSO based on the total power of three phases of each substation bus i is $$P_{S_i} = \Sigma_{m \in PH_i} P_{S_{i,m}}, \qquad (3)$$

wherein $PH_i$ is the set of available (i.e., energized) phases of bus i, $LMP_i$ is the locational marginal price (LMP) at substation bus i that cleared at a transmission energy market, and DSUB is the set of substation buses of the distribution system.

The second term of Eq. (2) is the production cost of distributed generations. $C_{i,m}(.)$ is the cost function for power generation at DG bus i on phase m. Typically, the function is a linear, or quadratic function of power generation, and the coefficients are pre-determined. DGBUS is the set of buses with DGs.

The third term of Eq. (2) is the cost of customer participated in the demand response program. $U_{i,m}(.)$ is used to define the consumers' discomfort level for participating in demand response at bus i on phase m. DRBUS is the set of buses with DRRs. The comfort loss of the customers at a specific bus and phase can be defined as a polynomial function of the reduced consumption, $(\overline{P}_{R_{i,m}} - P_{R_{i,m}})$, where $\overline{P}_{R_{i,m}}$ is the maximal power consumption at bus i on phase m, and presents the regular level of power consumption.

For example, when the DRR have a limited number of operating air conditioners, the comfort loss of each customer is directly related to the mean waiting time for the customer. The mean waiting time for each consumer to obtain electricity can be approximated by a polynomial function of the consumption deviation from the regular consumption level $\overline{P}_{R_{i,m}}$. Therefore, when DSO bids at the transmission market, the comfort loss function can be modeled as a polynomial function with pre-determined coefficients.

The AC-OPF problem for the distribution system is subject to a set of constraints, including nodal power flow equations, DG and DRR maximal and minimal capacity constraints, voltage lower and upper threshold constraints, and line power flow limits.

For any phase of any bus in the distribution system, the following nodal power flow equations must be satisfied:

$$P_{S_{i,m}} + P_{G_{i,m}} + P_{F_{i,m}} - P_{R_{i,m}} - P_{D_{i,m}} = V_{i,m} \Sigma_{j \in DBUS} \Sigma_{n \in PH_j} V_{j,n} [G^{AC\text{-}SYS}_{i,m\text{-}j,n} \cos(\theta_{i,m} - \theta_{j,n}) + B^{AC\text{-}SYS}_{i,m\text{-}j,n} \sin(\theta_{i,m} - \theta_{j,n})], \text{ for } i \in DBUS, m \in PH_i, \text{ and} \qquad (4)$$

$$Q_{S_{i,m}} + Q_{G_{i,m}} + Q_{F_{i,m}} - Q_{R_{i,m}} - Q_{D_{i,m}} = V_{i,m} \Sigma_{j \in DBUS} \Sigma_{n \in PH_j} V_{j,n} [G^{AC\text{-}SYS}_{i,m\text{-}j,n} \sin(\theta_{i,m} - \theta_{j,n}) + B^{AC\text{-}SYS}_{i,m\text{-}j,n} \cos(\theta_{i,m} - \theta_{j,n})], \text{ for } i \in DBUS, m \in PH_i, \qquad (5)$$

wherein

DBUS is the set of buses within the system, $PH_j$ is the set of energized phases at bus j, $P_{F_{i,m}}$ and $Q_{F_{i,m}}$ are the active and reactive power outputs of generators with fixed outputs at bus i on phase m, $P_{D_{i,m}}$ and $Q_{D_{i,m}}$ are the active and reactive power consumptions of inelastic loads at bus i on phase m, $Q_{S_{i,m}}$, $Q_{G_{i,m}}$ and $Q_{R_{i,m}}$ are the imported reactive power for substation, reactive power output for DGs, and reactive power consumptions of DRRs loads at bus i on phase m respectively, $V_{i,m}$ and $\theta_{i,m}$ are the voltage and phase angle of at bus i on phase m, $V_{j,n}$ and $\theta_{j,n}$ are the voltage and phase angle of at bus j on phase n, and $G_{i,m-j,n}^{AC-SYS}$ and $B_{i,m-j,n}^{AC-SYS}$ are the elements of system conductance and susceptance matrices at the row corresponding to bus i and phase m, and the column corresponding to bus j and phase n.

When reaching the optimal solution, the dual variables of the constraints in Eq. (4) are the DLMP for bus i on phase m.

The active and reactive powers acquired from the transmission system should be within minimal and maximal allowed purchase limits:

$$\underline{P}_{S_{i,m}} \leq P_{S_{i,m}} \leq \overline{P}_{S_{i,m}}, \ \epsilon DSUB, \ m\epsilon PH_i, \text{ and} \quad (6)$$

$$\underline{Q}_{S_{i,m}} \leq Q_{S_{i,m}} \leq \overline{Q}_{S_{i,m}}, \ \epsilon DSUB, \ m\epsilon PH_i, \quad (7)$$

wherein
$\overline{P}_{S_{i,m}}$ and $\underline{P}_{S_{i,m}}$ are the maximal and minimal active-power inputs at bus i on phase m, and
$\overline{Q}_{S_{i,m}}$ and $\underline{Q}_{S_{i,m}}$ are the maximal and minimal reactive-power inputs at bus i on phase m.

The active and reactive power outputs for distributed generators should be within lower and upper output thresholds:

$$\underline{P}_{G_{i,m}} \leq P_{G_{i,m}} \leq \overline{P}_{G_{i,m}}, \ \epsilon DSUB, \ m\epsilon PH_i, \text{ and} \quad (8)$$

$$\underline{Q}_{G_{i,m}} \leq Q_{G_{i,m}} \leq \overline{Q}_{G_{i,m}}, \ i\epsilon DSUB, \ m\epsilon PH_i, \quad (9)$$

wherein
$\overline{P}_{G_{i,m}}$ and $\underline{P}_{G_{i,m}}$ are the upper and lower thresholds of active power generations of DGs at bus i on phase m, and
$\overline{Q}_{G_{i,m}}$ and $\underline{Q}_{G_{i,m}}$ are the upper and lower thresholds of reactive power generations of DGs at bus i on phase m.

The upper and lower thresholds are determined by the technical limits of generators, and weather conditions for weather dependent generations such as solar and wind generators.

The demand responsive resources are constrained by upper thresholds determined by their maximal power demands, and lower thresholds determined by the maximal tolerable discomfort level of customers, according to:

$$\underline{P}_{R_{i,m}} \leq P_{R_{i,m}} \leq \overline{P}_{R_{i,m}}, \ \epsilon DSUB, \ m\epsilon PH_i, \text{ and} \quad (10)$$

$$\underline{Q}_{R_{i,m}} \leq Q_{R_{i,m}} \leq \overline{Q}_{R_{i,m}}, \ \epsilon DSUB, \ m\epsilon PH_i, \quad (11)$$

wherein
$\overline{P}_{R_{i,m}}$ and $\overline{Q}_{R_{i,m}}$ are the upper thresholds for active and reactive power consumptions of DRRs at bus i on phase m, and
$\underline{P}_{R_{i,m}}$ and $\underline{Q}_{R_{i,m}}$ are the lower thresholds for active and reactive power consumption of DRRs at bus i on phase m.

For each two-terminal branch, the absolute power flows on the branch from two directions should be within maximal power limits determined by thermal and stability requirements:

$$P_{ij,m}^{POS} = V_{i,m}\Sigma_{n\epsilon PH_{ij}} V_{i,n}[G_{i,m-i,n}^{AC-ij}\cos(\theta_{i,m}-\theta_{i,n})+B_{i,m-i,n}^{AC-ij}\sin(\theta_{i,m}-\theta_{i,n})]+V_{i,m}\Sigma_{n\epsilon PH_{ij}} V_{j,n}[G_{i,m-j,n}^{AC-ij}\cos(\theta_{i,m}-\theta_{j,n})+B_{i,m-j,n}^{AC-ij}\sin(\theta_{i,m}-\theta_{j,n})], \ ij\epsilon DBR, \ m\epsilon PH_{ij} \quad (12)$$

$$Q_{ij,m}^{POS} = V_{i,m}\Sigma_{n\epsilon PH_{ij}} V_{i,n}[G_{i,m-i,n}^{AC-ij}\sin(\theta_{i,m}-\theta_{i,n})-B_{i,m-i,n}^{AC-ij}\cos(\theta_{i,m}-\theta_{i,n})]+V_{i,m}\Sigma_{n\epsilon PH_{ij}} V_{j,n}[G_{i,m-j,n}^{AC-ij}\sin(\theta_{i,m}-\theta_{j,n})-B_{i,m-j,n}^{AC-ij}\cos(\theta_{i,m}-\theta_{j,n})], \ ij\epsilon DBR, \ m\epsilon PH_{ij} \quad (13)$$

$$P_{ij,m}^{REV} = V_{j,m}\Sigma_{n\epsilon PH_{ij}} V_{i,n}[G_{j,m-i,n}^{AC-ij}\cos(\theta_{j,m}-\theta_{i,n})+B_{j,m-i,n}^{AC-ij}\sin(\theta_{j,m}-\theta_{i,n})]+V_{j,m}\Sigma_{n\epsilon PH_{ij}} V_{j,n}[G_{j,m-j,n}^{AC-ij}\cos(\theta_{j,m}-\theta_{j,n})+B_{j,m-j,n}^{AC-ij}\sin(\theta_{j,m}-\theta_{j,n})], \ ij\epsilon DBR, \ m\epsilon PH_{ij} \quad (14)$$

$$Q_{ij,m}^{REV} = V_{j,m}\Sigma_{n\epsilon PH_{ij}} V_{i,n}[G_{j,m-i,n}^{AC-ij}\sin(\theta_{j,m}-\theta_{i,n})-B_{j,m-i,n}^{AC-ij}\cos(\theta_{j,m}-\theta_{i,n})]+V_{j,m}\Sigma_{n\epsilon PH_{ij}} V_{j,n}[G_{j,m-j,n}^{AC-ij}\sin(\theta_{j,m}-\theta_{j,n})-B_{j,m-j,n}^{AC-ij}\cos(\theta_{j,m}-\theta_{j,n})], \ ij\epsilon DBR, \ m\epsilon PH_{ij} \quad (15)$$

$$\sqrt{(P_{ij,m}^{POS})^2+(Q_{ij,m}^{POS})^2} \leq \overline{S}_{ij-m}, \ ij\epsilon DBR, \ m\epsilon PH_{ij} \quad (16)$$

$$\sqrt{(P_{ij,m}^{REV})^2+(Q_{ij,m}^{REV})^2} \leq \overline{S}_{ij-m}, \ ij\epsilon DBR, \ m\epsilon PH_{ij} \quad (17)$$

wherein
DBR is the set of branches within the system,
$PH_{ij}$ is the set of energized phases of the branch between bus i and bus j,
$P_{ij,m}^{POS}$ and $Q_{ij,m}^{POS}$ are the active and reactive powers flowing from bus i towards bus j on phase m of the branch,
$P_{ij,m}^{REV}$ and $Q_{ij,m}^{REV}$ are the active and reactive powers flowing from bus j towards bus i on phase m of the branch,
$\overline{S}_{ij-m}$ is the maximal power allowed on phase m of the branch.
$G_{i,m-i,n}^{AC-ij}$, $G_{i,m-j,n}^{AC-ij}$, $G_{j,m-i,n}^{AC-ij}$ and $G_{j,m-j,n}^{AC-ij}$ are the elements of branch conductance matrix of the branch at the row and column given by the subscript letters, in which the first twos give the corresponding bus and phase of the row, and last twos give the corresponding bus and phase of the column,
$B_{i,m-i,n}^{AC-ij}$, $B_{i,m-j,n}^{AC-ij}$, $B_{j,m-i,n}^{AC-ij}$ and $B_{j,m-j,n}^{AC-ij}$ are the elements of branch sucesptance matrix of the branch at the row and column given by the subscript letters, in which the first twos give the corresponding bus and phase of the row, and last twos give the corresponding bus and phase of the column,
$V_{j,m}$ and $\theta_{j,m}$ are the voltage and phase angle of at bus j on phase m.
$V_{i,n}$ and $\theta_{i,n}$ are the voltage and phase angle of at bus i on phase n.

For each phase of any bus, the phase voltage should be within lower and upper thresholds defined by technical and regulation requirements $$\underline{V}_{i,m} \leq V_{i,m} \leq \overline{V}_{i,m}, \ i\epsilon DBUS, \ \epsilon PH_i, \quad (18)$$

wherein $\overline{V}_{i,m}$ and $\underline{V}_{i,m}$ are the upper and lower voltage thresholds at bus i on phase m.

After solving the unbalanced three-phase AC OPF expressed as Eqs. (1)-(18), 660 the aggregated demand 630 of the distribution system is determined. The DLMP 680 for the distribution system 120 are determined based on the dual variables for each constraint, Eq. (4) at specific bus-phase pair.

Construction of Distribution Aggregated Utility Function

The TSO can determine the locational marginal prices for electricity usages of all DSOs through connected substations by minimizing the total cost of generation electric power within the transmission system, when the demands of distribution systems are fixed. However, when the DSO with DGs and DRRs bids in the transmission energy market, the flexibility of DSO on the power demands require the TSO to redefine its objective function to contain a benefit function, or distribution aggregate utility (DAU) to represent the summed preferences from the distribution network.

Different from conventional approaches that used assumed utility functions as the benefit function, one embodiment of the invent determines the distribution aggregated utility (DAU) through the integration the aggregated demand and price curve of the distribution system which obtained by solving the multiple unbalanced three-phase AC-OPF problems given various LMP from the TSO.

Figure 2:
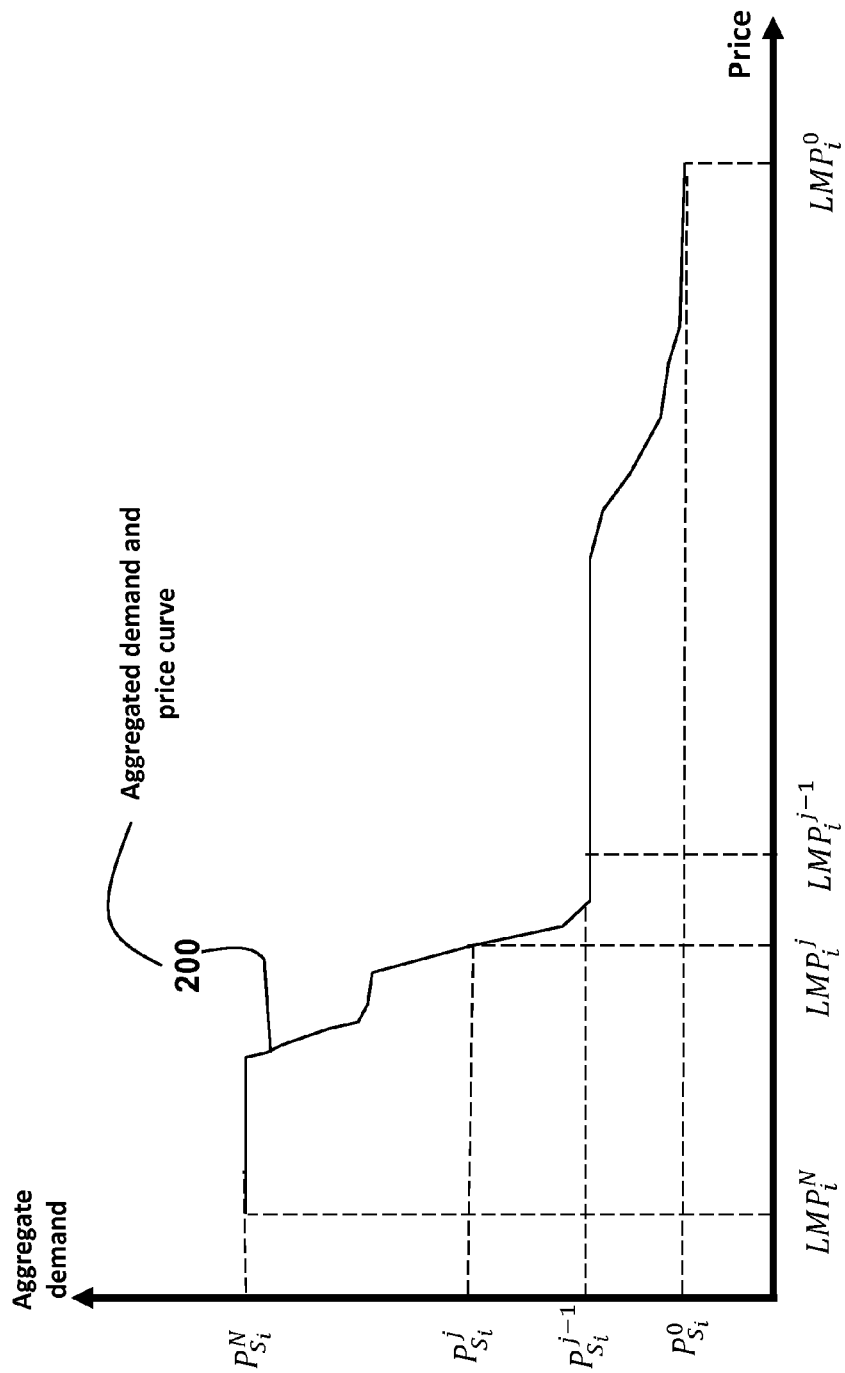
FIG. 2 is an aggregated demand and price curve for a substation used by embodiments of the invention, in which the aggregated demand of the substation is represented as a function of a locational marginal price (LMP) at the substation.

FIG. 2 shows an aggregated demand curve 200 of a distribution system with the LMPs at a substation. According to convention, the demand curve is drawn with the price on the horizontal axis and the amount demanded on the vertical. The DAU function represents the pattern of aggregated demand with respect to substation LMP. As shown in FIG. 2, as the LMP at the substation is increasing, the aggregated demand is expected to decrease due to:

(a) increased of distributed generation incentivized by the increased LMP; and (b) decreased amount of consumption from the DRR.

When the LMP is low, there is no monetary incentive to provide distributed generation, or for consumers to provide DRR. This results a flat demand. As LMP increases, DG with various generation costs start to provide electricity that reduces the aggregated demand of the distribution system until a static level where all DG are operational. The aggregated demand further decreases when the LMP is relatively high, and the DRR reduce consumption to a minimal level.

By solving the AC-OPF with various LMP, a set of sampling points of the LMP-demand pairs can be obtained. Using curve fitting techniques, the distribution aggregated demand can be determined as a function of LMP as $$P_{S_i} = g(LMP_i). \quad (19)$$

As shown in FIG. 2, and assuming there are (N+1) distinct samples available, the distribution aggregated demand curve can also be represented by a series of points sorted by the magnitude of demand as $$\{(P_{S_i}^0, LMP_i^0), \ldots, (P_{S_i}^{j-1}, LMP_i^{j-1}), (P_{S_i}^j, LMP_i^j), \ldots, (P_{S_i}^N, LMP_i^N)\}. \quad (20)$$

The first pair of elements represents the minimal demand at the substation, $\underline{P_{S_i}}$ and corresponding LMP, $LMP_i^0$. The last element shows the maximal demand at the substation $\overline{P_{S_i}}$, and corresponding LMP, $LMP_i^N$. The total number of sampling point is (N+1). For two adjacent pairs, $(P_{S_i}^{j-1}, LMP_i^{j-1})$ and $(P_{S_i}^j, LMP_i^j)$, $P_{S_i}^{j-1} < P_{S_i}^j$, but $LMP_i^{j-1} > LMP_i^j$.

When the aggregated demand function is determined as expressed in equation (19), the aggregated distribution system benefit (utility) function can be determined as $$B_i(P_{S_i}) = \underline{P_{S_i}} * DLMP_i^0 + \int_{\underline{P_{S_i}}}^{P_{S_i}} g^{-1}(P_{S_i}) dP_{S_i}, \quad (21)$$

where $B_i(P_{S_i})$ is the benefit (utility) gained by consuming power $P_{S_i}$ at the substation bus i. $g^{-1}(.)$ is the inverse of the aggregated demand function. The first term of equation (21) is the utility of consuming fixed energy level at $\underline{P_{S_i}}$ with price $DLMP_i^0$. The second term is the integration of incremental utility gain by consuming incremental energy $dP_{S_i}$ at price $g^{-1}(P_{S_i})$.

When the aggregated demand function is expressed as in equation (20), the aggregated distribution system benefit (utility) function can be determined as a piece-wise function $$B_i(P_{S_i}) = \underline{P_{S_i}} * DLMP_i^0 + \sum_{t=1}^{j-1} DLMP_i^t (P_{S_i}^t - P_{S_i}^{t-1}) + DLMP_i^j * (P_{S_i} - P_{S_i}^{j-1}), \quad (22)$$

for $P_{S_i}^{j-1} \le P_{S_i} \le P_{S_i}^j$, $1 \le j \le N$.

Figure 3:
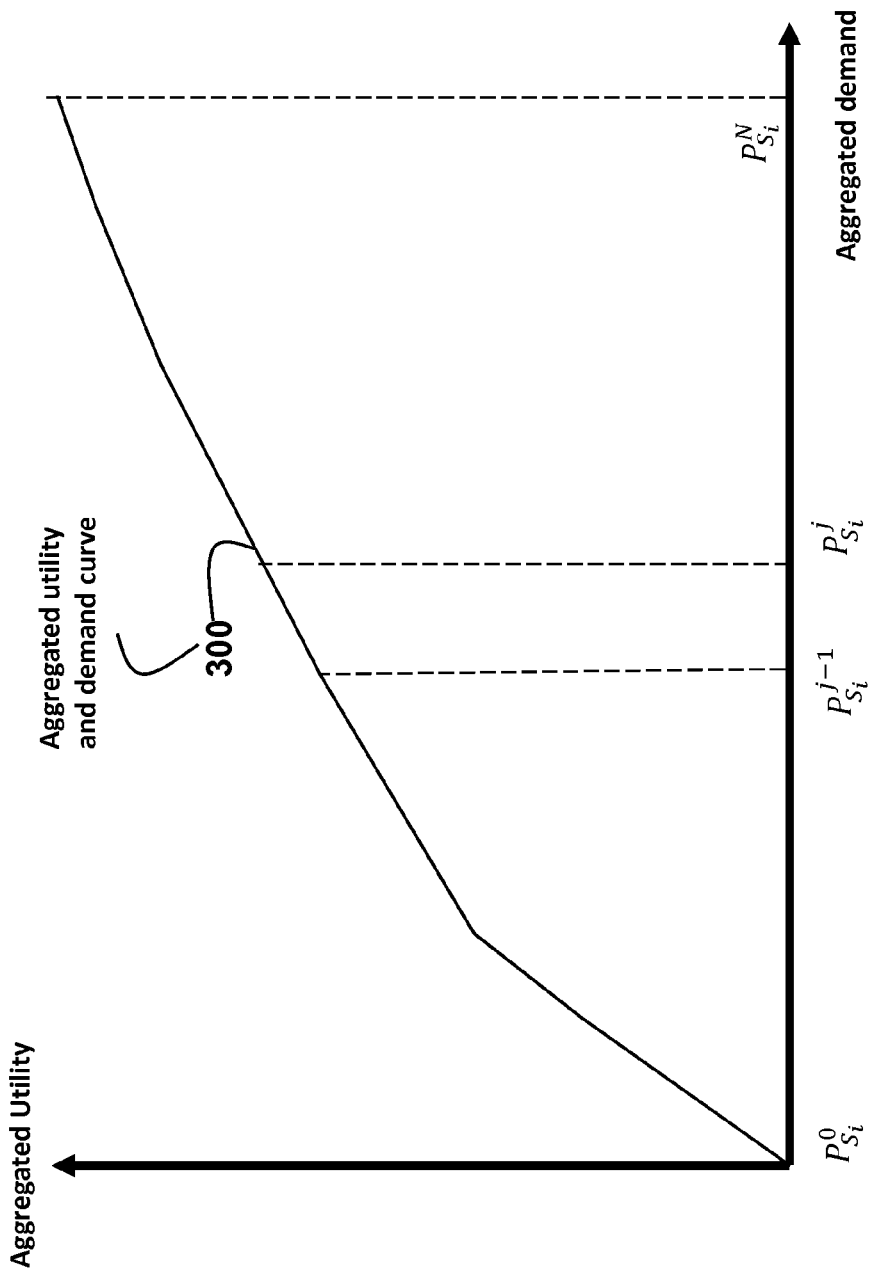
FIG. 3 is an aggregated utility and demand curve for the substation used by embodiments of the invention, in which the aggregated utility is represented as a function of aggregated demand at the substation.

FIG. 3 shows an aggregated benefit curve $B_i(P_{S_i})$ 300 obtained by integrating the demand curve 200. As shown in FIG. 3, the function $B_i(P_{S_i})$ is a concave function of $P_{S_i}$ consistent with the law of diminishing marginal utility in economy theory.

Based on the distribution aggregated utility (DAU) function, $B_i(P_{S_i})$ provided by the DSO, the TSO solves the balanced single-phase DC-OPF problem 650 to obtain the LMPs at the transmission level.

A transmission system is mainly three-phase balanced, and can be modeled with a direct-current (DC), or linearized single-phase power flow model. The system can be regarded as lossless on the lines and transformers, and no voltage-drops among buses. The power flow only considers the total active power of three phases, and phase angle difference at one of the phases of buses, i.e., the first phase.

The balanced single-phase DC OPF problem is formulated as $$\min_{P_{G_i}, P_{S_i}} \left[ \sum_{i \in TGBUS} C_i(P_{G_i}) - \sum_{i \in TBUS} B_i(P_{S_i}) \right], \quad (23)$$

$$\text{s.t.} \quad P_{G_i} - P_{S_i} - P_{D_i} = \sum_{j \in TBUS} B_{i-j}^{DC-SYS}(\theta_i - \theta_j), \quad i \in TBUS, \quad (24)$$

$$\underline{P_{G_i}} \le P_{G_i} \le \overline{P_{G_i}}, \in TGBUS, \quad (25)$$

$$\underline{P_{S_i}} \le P_{S_i} \le \overline{P_{S_i}}, \in TBUS, \quad (26)$$

$$P_{ij} = B^{DC-ij}(\theta_i - \theta_j), \in TBR, \text{ and} \quad (27)$$

$$|P_{ij}| \le \overline{P_{ij}}, \in TBR, \quad (28)$$

where

TBUS is the set of all buses within the transmission system,
TGBUS is the set of buses with generators,
TBR is the set of all branches within the system,
$P_{G_i}$, $\underline{P_{G_i}}$ and $\overline{P_{G_i}}$ are the total active power output of three phases of generators at bus i, and its lower and upper output thresholds,
$C_i(.)$ is the function of production cost of generations at bus i,
$P_{S_i}$, $\underline{P_{S_i}}$ and $\overline{P_{S_i}}$ are the total active power consumption of three phases of bus i that connected to DSOs, and its lower and upper output thresholds,
$P_{D_i}$ is the total active power consumption of three phases of bus i,
$P_{ij}$ and $\overline{P_{ij}}$ are the total active power of three phases flowing on the branch between bus i and bus j, and the maximal allowed power on the branch,
$B_{i-j}^{DC-SYS}$ is the element of DC system susceptance matrix at the row corresponding to bus i and the row corresponding to bus j,
$B^{DC-ij}$ is the DC branch susceptance of branch between bus i and bus j, and
$\theta_i$ and $\theta_j$ are the phase angle of the first phase of bus i and bus j respectively.

The first item in Eq. (23) is the sum of the production cost of power generations in the transmission level, and the second item in Eq. (23) is the negative sum of the distributed aggregated utility (DAU) function of distribution systems. After solved the balanced DC OPF problem, the LMPs for substations connected to DSOs can be determined as the dual variables of power flow equation (24).

The above problem can be solved in a centralized manner by the TSO when the TSO knows the benefit function $B_i(P_{S_i})$, or in a distributed way by each DSO when only the DSO knows the function $B_i(P_{S_i})$. When the solution reaches optimality, the cleared LMP and quantity of demand at bus i satisfies $$LMP_i = \frac{dB_i(P_{S_i})}{dP_{S_i}}.$$

This means that $\{LMP_i, P_{S_i}\}$ is a competitive equilibrium solution for the system such that the neither the TSO nor the DSO have an incentive to change the price or the demand, given the demand or price provided by the other.

A key assumption in the above approach is that either the TSO or the DSO knows the benefit function of representing the flexibility at distribution level as $B_i(P_{S_i})$. Equivalently, it means that the DSO can construct the benefit function based on the demand curve $g(LMP_i)$ 200.

However, the high penetration of distributed generation and DRR in modern electric power systems makes it difficult for the DSO to obtain $g(LMP_i)$. Even when the $g(LMP_i)$ is obtained by solving distribution level AC OPF with different value of $LMP_i$, the DRR participants can change their commitment status, as well as the amount to commit, in a time frame of minutes, based on information such as temperature, occupancy, etc. It is unrealistic for the DSO and TSO to obtain $g(LMP_i)$ as well as $B_i(P_{S_i})$ for every change in commitment status. Therefore, a solution is required to deal with the situations that neither the TSO nor the DSO can obtain these preferences in real time.

The next section describes an iterative framework to reach the competitive equilibrium when this information is missing.

Competitive Equilibrium Between the Transmission and Distribution Network

It is known that the LMP at the substation and the aggregated distribution demand are strongly coupled. In order for both the transmission and the distribution market to be efficient, a global optimal solution is required for determining the competitive equilibrium in the absence of knowing the benefit function $B_i(P_{S_i})$. When the distribution level aggregate demand function or utility function is not provided to the TSO, the TSO clears the transmission level market by viewing the distribution level as being fixed (inelastic).

The aggregated demand can be based on the fixed (inelastic) demand 671, the DRR 672. The DG 673 and fixed generation 674 can be expressed as negative demand. $B_i(P_{S_i})$ is set as zero.

The LMP 640 is calculated and passed to the DSO. The LMP is used by the DSO to solve the AC OPF 660 and reports the aggregated demand information 630 to the TSO. This procedure iterates until convergence to the competitive market equilibrium.

Figure 6:
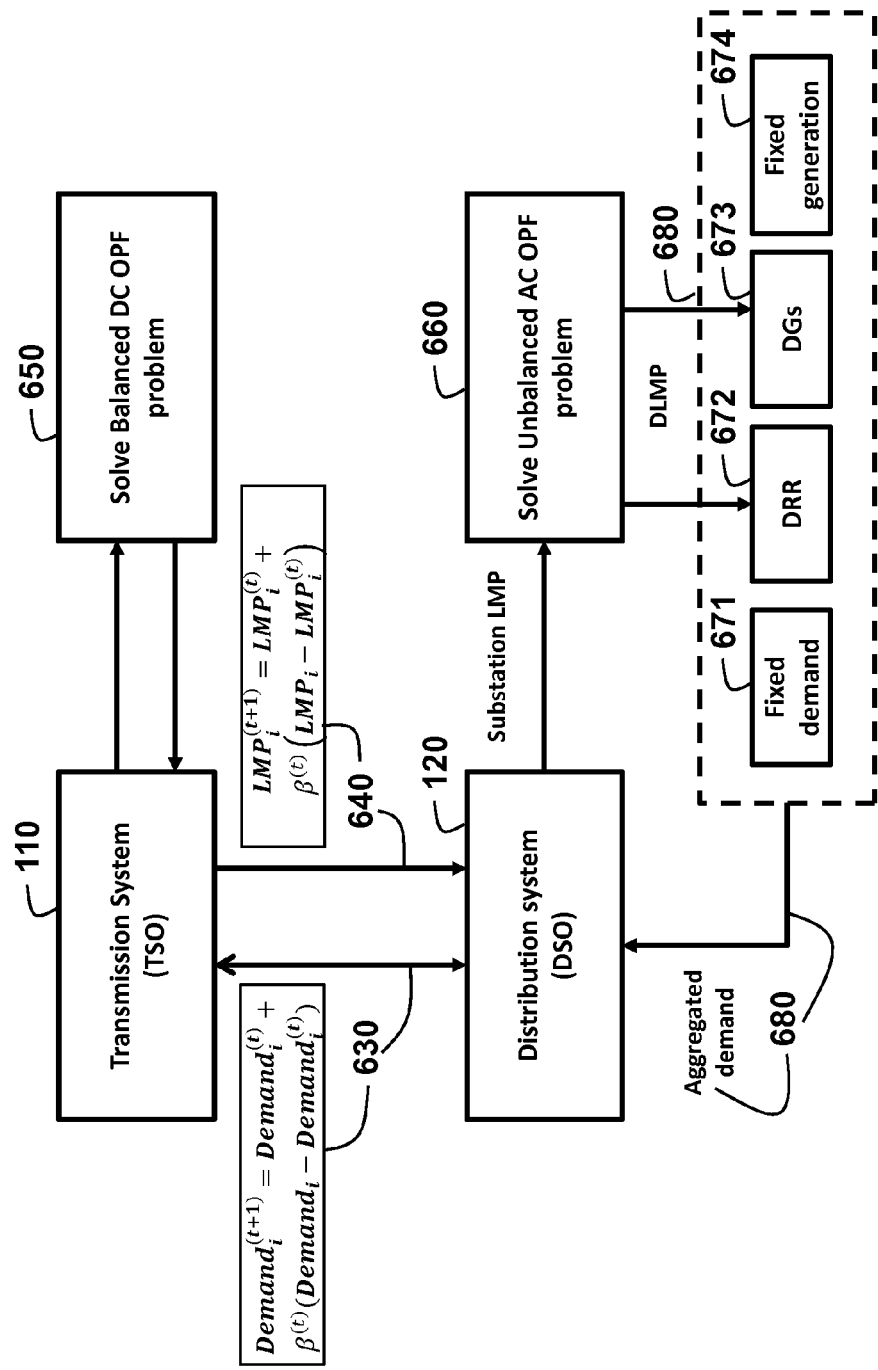
FIG. 6 is a detailed schematic of the system and method for operating the electric power system of FIG. 1A according to embodiments of the invention.

As shown in FIGS. 1B and 6, the method operates as follows:

1) Estimate an initial aggregated demand $P_{S_i}^{(0)}$ 680 at time t=0.
2) At time t, the TSO 110 solves 650 the balanced single-phase DC OPF based on $P_{S_i}^{(t)}$, and provides the $LMP_i^{(t)}$ 640 to the DSO.
3) The DSO 120 solves 660 for the unbalanced AC three-phase OPF based on $LMP_i^{(t)}$, and provides an updates aggregated demand $P_{S_i}^{(t+1)}$ 630 to the TSO.
4) Converge when $|P_{S_i}^{(t)} - P_{S_i}^{(t+1)}| < \epsilon$, and $|LMP_i^{(t)} - LMP_i^{(t+1)}| < \epsilon$, then the method terminates, else go to step (5).
5) Increase t by 1, go to step (2).

The above procedure cannot guarantee convergence to the competitive equilibrium due to implicit characteristics of the distribution level aggregated demand function and the transmission level aggregated supply function at bus i.

Figure 4:
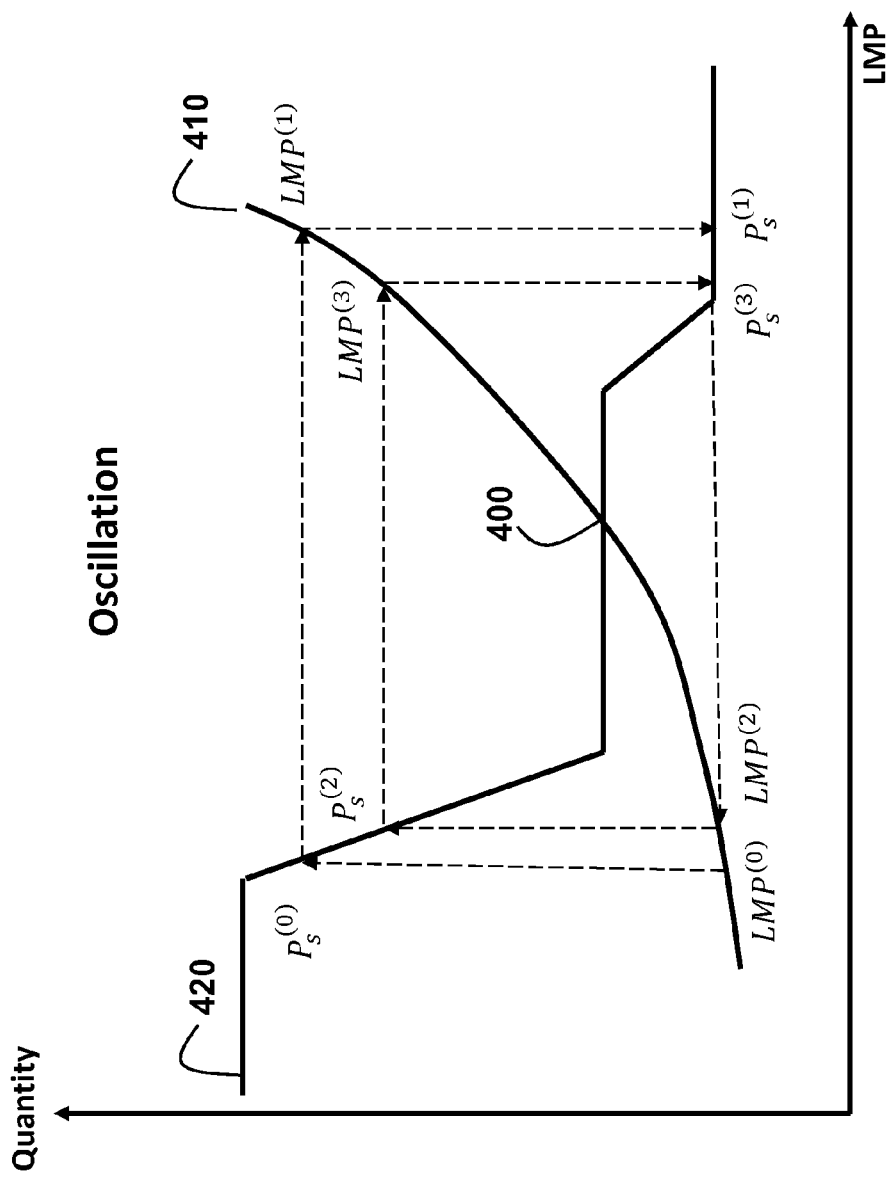
FIG. 4 is an example curve of oscillation during an iterative update of the LMP and demand.

FIG. 4 shows example supply 410 and demand 420 curves where oscillations inhibit the system from reaching the competitive equilibrium. The supply curve is the transmission level net supply function $h(LMP_i)$ to the bus i given the LMP. The demand curve is the aggregated distribution level demand function $g(LMP_i)$ that describes the demand change as a function of LMP. The LMP at bus i increases as the injection (real power demand) at bus i increases. The competitive equilibrium is cleared at the intersection of the two curves.

When the $g(LMP_i)$ and the $h(LMP_i)$ are known, the solution is the intersection 400 of the two curve. When both the $g(LMP_i)$ and the $h(LMP_i)$ are unknown, the equilibrium can be reached by the iterative method described above. However, starting from an initial price estimate $LMP_i^{(0)}$, the dashed lines show the trajectory of the iterations to demand $P_{S_i}^{(0)}$, price $LMP_i^{(1)}$ and so forth, until cycling between the four points that are the corner of the rectangle.

Figure 5:
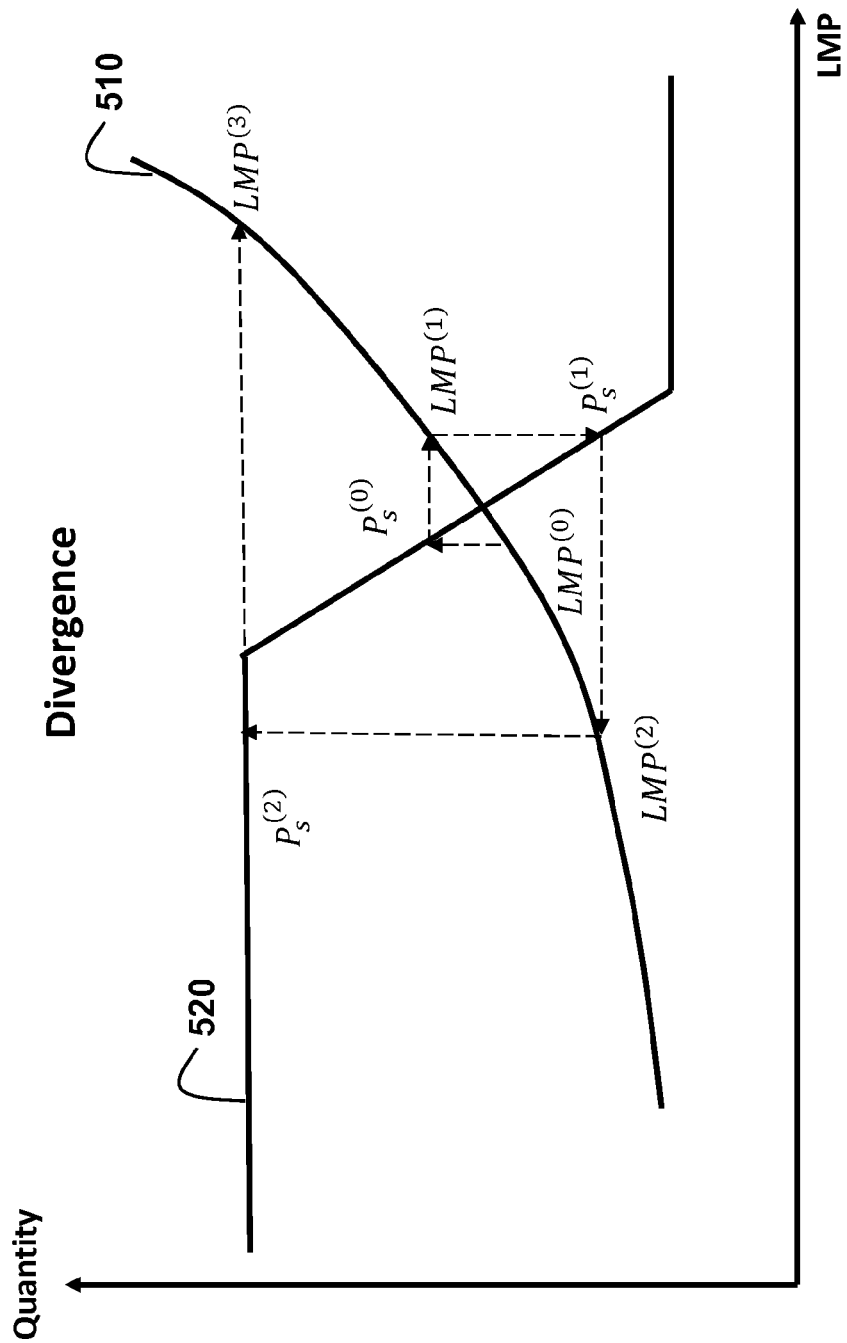
FIG. 5 is another example curve of divergence in iterative update of the LMP and demand.

FIG. 5 shows example supply 510 and demand 520 curves with divergence. During the iteration, both the LMP and the demand tend to diverge away from the competitive equilibrium.

The key issue resulting in oscillation or divergence is that the information passes to the other network overshoots above the equilibrium level. To solve this problem, a modified method is provided below to avoid cycling.

Modified Method (1) Estimate net demand $P_{S_i}^{(0)}$ and $LMP_i^{(0)}$ at time t=0.
(2) The TSO solves for the balanced single-phase DC OPF to obtain the $LMP_i$ based on the DSO's demand $P_{S_i}^{(t)}$, and then provides the $LMP_i^{(t+1)}$ to the DSO according to:

$$LMP_i^{(t+1)} = LMP_i^{(t)} + \beta^{(t)}(LMP_i - LMP_i^{(t)}), \quad (29)$$

wherein, $\beta^{(t)}$ is the step size for time t.

(3) The DSO solves for the unbalanced three-phase AC OPF to obtain the $P_{S_i}$ based on $LMP_i^{(t+1)}$, and then provides updated demand $P_{S_i}^{(t+1)}$ to the TSO according to:

$$P_{S_i}^{(t+1)} = P_{S_i}^{(t)} + \beta^{(t)}(P_{S_i} - P_{S_i}^{(t)}) \quad (30)$$

(4) When convergence requirements are met:

$$|P_{S_i}^{(t)} - P_{S_i}^{(t+1)}| < \epsilon, \quad (31)$$

$$|DLMP_i^{(t)} - DLMP_i^{(t+1)}| < \epsilon, \quad (32)$$

$$|P_{S_i}^{(t)} - P_{S_i}^{(t+1)}| < \epsilon, \text{ and} \quad (33)$$

$$|DLMP_i^{(t)} - DLMP_i^{(t+1)}| < \epsilon, \quad (34)$$

terminate, else go to step (5).

(5) Increase t by 1, and continue at step (2)

Iterative Framework

FIG. 6 is a schematic of a system and method according to embodiments of the invention for an iterative framework between the TSO transmission level market clearing and DSO distribution level clearing located at bus i. The system includes the transmission system 110 operated by the TSO and the distribution system 120 operated by the DSO. The TSO solves 650 the balanced single-phase DC OPF problem, and the DSO solves 660 unbalanced three-phase AC OPF problem.

$LMP_i^{(t)}$ is the LMP passed to the DSO by TSO at iteration t. At iteration (t+1), the TSO first solves the LMP for bus i as $LMP_i$, and then passes a new price $LMP_i^{(t+1)}$ 640 to the DSO as defined in Eq. (29). The update of $LMP_i^{(t+1)}$ is a convex combination of $LMP_i^{(t)}$ and $LMP_i$ because the value of $LMP_i$ can overshoot the optimal competitive equilibrium.

The step size $\beta^{(t)}$ for the update is in a range (0, 1). A constant step size can be used where the value of $\beta^{(t)}$ is fixed.

The update with constant step size has faster convergence rate for some problems, but it can result in oscillation or divergence.

A diminishing step size can also be used where $\beta^{(t)} \rightarrow 0$ as $\rightarrow +\infty$, and $\Sigma_{t=1}^{\infty} \beta^{(t)} = \infty$. This gradually puts more weight on $\mathrm{LMP}_i^t$ as proceeding to the end of the iterations. For example, the step size can be set as:

$$\beta^{(t)} = \frac{1}{t+1}.$$

The update with diminishing step size needs more iteration to converge, but may have less chance to get into oscillation or divergence.

Parallel to the update structure of the transmission level LMP, the DSO updates the demand $P_{S_i}$ 630 with the same structure to prevent overshooting as defined in Eq. (30). In Eq. (30), $P_{S_i}^{(t)}$ is the demand reported to the TSO at iteration t, and $P_{S_i}$ is the distribution level market clearing result based on substation price $\mathrm{LMP}_i^{(t+1)}$.

The method terminates when the four conditions described in Eq. (31-34) are satisfied. These conditions correspond to the convergence of cleared LMP and demand between successive steps, as well as the convergence of the LMP and demand between the actual cleared value and the communicated value.

Modeling of Multi-Period Optimal Operation of Power Systems with Distribution Flexibility When there is strong coupling between power demands of DRRs or power generations of DGs at consecutive periods, a multi-period solution can dynamically schedule the loads and generations. One example of multiple period applications is the determination of load shifting between different operating periods for some type of DRRs. There are two embodiments to solve the multi-period problem.

In a first embodiment, the multi-period problem is solved sequentially as multiple single-period problems, and the results are directly combined together as final solution for the multi-period scheduling. This solution is suboptimal because it is difficult for the DSO to properly evaluate consumers' utility function given that consumers have already participated in DRR in previous periods because their utility function is implicitly governed by some states of operating, e.g., appliances, that are based on the past consumption scheduling.

The second embodiment extends the single-period optimal operation model to multi-period case by adding temporal constraints to both DGs and DRRs. The demands of DRRs and generations of DGs for multiple periods are determined by solving an optimal problem with objective and constraints for all multiple periods. The constraints for DRRs include constraints for each individual interval, and constraints for inter-intervals.

For example, for DRRs with fixed time consumptions, the DRRs provide the DSO their allowable energy consumption set at each interval where the DSO can manipulate their consumption. If the regular consumption level of consumer at time t and phase m of bus i is $P_{R_{i,m}}^{reg}(t)$, then the allowable consumption range is restricted by a preference parameter, $\alpha_{i,m}$, provided by consumers in the phase m of bus i $$P_{R_{i,m}}^{reg}(t)(1-\alpha_{i,m}) \leq P_{R_{i,m}}(t) \leq P_{R_{i,m}}^{reg}(t)(1+\alpha_{i,m}), \; m \in PH_i. \quad (35)$$

Inter-temporal constraints are used to guarantee that each DRR receives a proper amount of energy over the course of some periods. These constraints have different forms based on specific appliances type.

For example, if an electric vehicle connected to the phase m of bus i needs to be charged by an amount of $P_{R_{i,m}}^{total}$ by a deadline indexed by T, then the inter-temporal constraint can be expressed as $$\Sigma_{t=0}^{T} P_{R_{i,m}}^{EV}(t) = P_{R_{i,m}}^{total}, \; m \in PH_i, \quad (36)$$

where $P_{R_{i,m}}^{EV}(t)$ is the power consumed by the electric vehicle at interval t on the phase m of bus i.

For appliances with duty cycles, such as air conditioners or water heaters, the inter-temporal constraints have cyclic forms because the DSO needs to guarantee energy neutrality for every a few consecutive periods such that consumers get the total amount of desired energy by the end of each cycling periods of length T. This leads to the following structure of constraint $$\Sigma_{t=0}^{T} P_{R_i}^{AC}(t) = \Sigma_{t=0}^{T} P_{R_i}^{AC,reg}(t), \quad (37)$$

where $P_{R_i}^{AC}(t)$ is the power consumed by the duty cycle appliances at interval t on all phases of bus I, and $P_{R_i}^{AC,reg}(t)$ is the power regularly consumed by the appliances at interval t on all phases of bus i.

The generalized temporal constraint structure can be based on the state space models formulated for specific DRRs. If the state of an appliance is denoted by $x_{i,m}(t)$, the consumption based dynamics can be described as $$x_{i,m}(t+1) = f(x_{i,m}(t), P_{R_{i,m}}(t), \; m \in PH_i, \quad (38)$$

where, $x_{i,m}(t+1)$ is the state of the appliance at next interval (t+1), $f(.)$ is the function to describe the relationship between states at interval t and (t+1). The temporal consumption constraints for $P_{R_{i,m}}(t)$ is implicitly governed by the satisfaction of $$x_{i,m}(t+1) \subset S_{x_{i,m}(t+1)}, \; m \in PH_i, \quad (39)$$

where $S_{x_{i,m}(t+1)}$ is the allowable set of state x at time (t+1) specified by the DRR at bus i on phase m.

For example, the state variable for electric vehicles is the state of charge. The dynamics of state $x_{i,m}(t)$ is based on the charging rate at time t, which influences the level of electricity consumption, $P_{R_{i,m}}(t)$. Constraints at each period correspond to the maximal and minimal allowable charging rate. The hard constraint at time T is $x_{i,m}(T)=1$.

The state variable for an air conditioner is the desired temperature. Dynamics of the temperature is based on thermal feature of the appliances and inside and outside temperatures. Constraints at each period include the consumption constraint specified by the maximal and minimal electricity usage of the appliance, and the state variable constraint specified by the maximal and minimal room temperature preferences of the consumers.

The DGs can also have inter-temporal constraints. For example, the maximal and minimal generation changes between periods are limited by the maximal and minimal ramping rate of distributed generators:

$$\underline{RAMP}_{i,m} \leq P_{G_{i,m}}(t+1) - P_{G_{i,m}}(t) \leq \overline{RAMP}_{i,m}, m \in PH_i, \quad (40)$$

where, $P_{G_{i,m}}(t)$ and $P_{G_{i,m}}(t+1)$ are the generation outputs on phase m of bus i at time t and time (t+1) respectively. $\overline{RAMP}_{i,m}$ and $\underline{RAMP}_{i,m}$ are the maximal and minimal ramp rates of DGs on phase m of bus i. The ramp rate is the output power difference (positive or negative) of a generator over time, which can vary for some DG, such as wind turbines and solar panels.

Similar to the optimization described above, the DSO solves a multi-period unbalanced three-phase AC OPF problem for distribution system based on the LMP vector 640

$$\overrightarrow{LMP}_i = [LMP_i(1), \ldots, LMP_i(T)]$$

that is passed from the TSO. After an optimal solution has been found, the DSO sends the demand vector 630

$$\vec{P}_{S_i} = [P_{S_i}(1), \ldots, P_{S_i}(T)]$$

to the TSO. As for the transmission level, the TSO solves a multi-period balanced single-phase DC OPF problem for the transmission system based on the demand information $\vec{P}_{S_i}$ passed from the DSO, and $\overrightarrow{LMP}_i$ and $\vec{P}_{S_i}$ are updated according to Eq. (29) and Eq. (30).

Oscillation and divergence are expected to happen when an improper step size is used. However, oscillation or divergence can prevent the method from converging during at single period. Convergence can also be prevented due to the switching of price and demand over multiple periods. The use of diminishing step size can facilitate convergence more easily than a constant step size.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for operating an electric power system, wherein the electric power system includes a transmission system operated by a transmission system operator (TSO) and multiple distribution systems, such that each distribution system is operated by a distribution system operator (DSO), comprising iterative steps:
   solving, by the DSO, an unbalanced three-phase alternating current (AC) optimal power flow (OPF) problem based on locational marginal prices (LMP) for power usage for each distribution system, wherein the DSO provides an input on a user input interface to one or more processor in communication with the user input interface and a network, when the DSO cannot obtain an aggregated demand curve at the distribution level, so as to update aggregated demand information for each distribution system in the electric power system, wherein the one or more processor is in communication with other processors of the one or more processor that receive measured electrical values of each distribution system including voltages and phase angles; and
   solving, by the TSO, a balanced single-phase direct current (DC) OPF problem to update the LMP for each distribution system, to minimize power generation and distributing cost based on the updated aggregated demand information, iteratively, until a competitive equilibrium reaches a predetermined threshold between aggregated demand and the LMP that results at a market clearing price and demand for energy (MCPDE) for the distribution system.

2. The method of claim 1, further comprising:
   updating, by the DSO for the TSO, the aggregated demand information according to a linear combination of the aggregated demand information at a last iteration and the aggregated demand based on a last LMP provided by TSO; and
   updating, by the TSO for the DSO, the LMP determined according to a linear combination of the LMP at the last iteration, and the LMP based on a last aggregated demand information provided by DSO.

3. The method of claim 2, wherein a diminishing time step size is used by the iterative steps to prevent oscillation or divergence while updating of the LMP and the aggregated demand information.

4. The method of claim 1, wherein the DSO uses an objective function to minimize a cost that is a sum of power from the TSO, power from distributed generators (DG), and comfort losses by demand responsive resources (DRR).

5. The method of claim 4, wherein the DG include solar and wind generators, and the DRR includes price responsive loads.

6. The method of claim 1, wherein the unbalanced three-phase (AC) (OPF) problem is subject to per phase and per bus constraints on active and reactive power flow equations, voltage limits, DRR and DG capacity limits, and per phase and per branch constraints on branch flow limits.

7. The method of claim 6, further comprising:
   determining a distribution locational marginal price (DLMP) for each phase of each bus of the distribution system as a dual variable of an active power flow equation corresponding to the phase, and the bus in the unbalanced three-phase AC OPF problem.

8. The method of claim 7, further comprising:
   paying the DG for generating power using the DLMP corresponding to the phase and the bus of the DG;
   paying the DRR for demand deviation from regular consumption level using the DLMP corresponding to the phase and the bus of the DRR; and
   charging consumers with load demands using the DLMP corresponding to the phase and the bus of the loads.

9. The method of claim 1, further comprising:
   determining the MCPDE by solving the unbalanced three-phase AC OPF problem and the balanced single-phase DC OPF problem for a single operating period, wherein the unbalanced three-phase AC OPF problem is solved by minimizing a cost function over the operating period with constraints of power flow equations, and locational based capacity constraints for DGs and DRRs for the operational period, and wherein the balanced single-phase DC OPF problem minimizes the cost function with constraints for the operational period.

10. The method of claim 1, further comprising:
    determining a set of the MCPDE by solving the unbalanced three-phase AC OPF problem and the DC OPF problem for multiple periods, wherein the unbalanced three-phase AC OPF problem is solved by the DSO to minimize a cost function over the multiple periods with constraints on power flow equations, and locational based capacity constraints for DGs and DRRs for each period, and inter-temporal constraints for the DG and the DRR between different periods, and wherein the balanced single-phase DC OPF problem minimizes a cost function with the inter-temporal constraints for the multiple periods.

11. The method of claim 1, further comprising:
    updating, by the DSO for the TSO, the aggregated demand information based on the LMP provided by the TSO; and
    determining, by the TSO, the LMP based on the updated aggregated demand information to minimize a cost of generating power.

12. The method of claim 1, further comprising:
    updating, by the DSO for the TSO during each iteration, the aggregated demand information and a distribution aggregated utility function for the distribution system based on the LMP and a feasible range of the LMP provided by the TSO; and determining, by the TSO, the LMP based on the aggregated demand information and a utility function provided by DSO and minimize a sum of production cost of power generations in the transmission level and a negative sum of the distributed aggregated utility function of the distribution system.

13. The method of claim 12, further comprising:
determining the distribution aggregated utility function by integration a distribution aggregated demand curve and the feasible range of aggregated demand of the distribution system.

14. The method of claim 1, wherein the aggregated demand information includes an amount of the aggregated demand for power and a distribution aggregation utility function.

15. The method of claim 1, wherein the electric power system includes fixed and variable generators and fixed and variable loads.

16. The method of claim 1, wherein the steps are implemented by processors at the DSO and the TSO.

17. The method of claim 1, wherein the power distribution system is modeled by a system admittance matrix, and a set of branch admittance matrices for each branch in the power distribution system.

18. A method for operating a power system, wherein the power system includes a transmission system operated by a transmission system operator (TSO) and multiple distribution systems, such that each a distribution system is operated by a distribution system operator (DSO), comprising iterative steps:
solving, by the DSO, an balanced single-phase alternating current (AC) optimal power flow (OPF) problem based on locational marginal prices (LMP) for power usage for each distribution system, wherein the DSO provides an input on a user input interface to one or more processor in communication with the user input interface and a network, when the DSO cannot obtain an aggregated demand curve at the distribution level, so as to update aggregated demand information for each distribution system in the power system, wherein the one or more processor is in communication with other processors of the one or more processor that receive measured electrical values of each distribution system including voltages and phase angles; and
solving, by the TSO, a balanced single-phase direct current (DC) OPF problem to update the LMP for each distribution system, to minimize power generation and distributing cost based on the updated aggregated demand information, iteratively, until a competitive equilibrium reaches a predetermined threshold between aggregated demand and the LMP that results at a market clearing price and demand for energy (MCPDE) for the distribution system.

19. The method of claim 1, wherein the predetermined threshold is based on when $|P_{S_i}^{(t)} - P_{S_i}^{(t+1)}| < \epsilon$, and $|LMP_i^{(t)} - LMP_i^{(t+1)}| < \epsilon$, such that $|P_{S_i}^{(t)} - P_{S_i}^{(t+1)}|$ is an aggregated demand difference between two consecutive iterations, where $P_{S_i}$ is an aggregated demand of the distribution system, and (t) is the current iteration, and (t+1) is the next iteration, and e is a number approximate to zero, and $|LMP_i^{(t)} - LMP_i^{(t+1)}|$ is a locational marginal price difference between two consecutive iterations, where $LMP_i$ is a locational marginal price of the distribution system, and (t) is the current iteration, and (t+1) is the next iteration.

20. A system for operating an electric power system, wherein the electric power system includes a transmission system operated by a transmission system operator (TSO) and multiple distribution systems, such that each distribution system is operated by a distribution system operator (DSO), comprising:
one or more processor in communication with input interfaces and a network used by the DSO is configured to solve an unbalanced three-phase alternating current (AC) optimal power flow (OPF) problem based on locational marginal prices (LMP) for power usage for each distribution system, wherein the DSO provides an input on a user input interface to the one or more processor in communication with the user input interface and a network, when the DSO cannot obtain an aggregated demand curve at the distribution level, so as to update aggregated demand information for each distribution system in the electric power system, wherein the one or more processor is in communication with other processors of the one or more processor that receive measured electrical values of each distribution system including voltages and phase angles; and
using another processor of the one or more processor in communication with an input interface of the input interfaces and the network by the TSO, the TSO is configured to solve a balanced single-phase direct current (DC) OPF problem to update the LMP for each distribution system, to minimize power generation and distributing cost based on the updated aggregated demand information, iteratively, until a competitive equilibrium reaches a predetermined threshold between aggregated demand and the LMP that results at a market clearing price and demand for energy (MCPDE) for the distribution system.

* * * * *